United States Patent
Volk

(10) Patent No.: US 6,176,775 B1
(45) Date of Patent: Jan. 23, 2001

(54) FRESH AIR NOZZLE DEVICE FOR A VEHICLE

(75) Inventor: Siegfried Volk, Kronach-Neuses (DE)

(73) Assignee: Dr. Franz Schneider Kunststoffwerke GmbH & Co., Kronach-Neuses (DE)

( * ) Notice: Under 35 U.S.C. 154(b), the term of this patent shall be extended for 0 days.

(21) Appl. No.: 09/333,573

(22) Filed: Jun. 16, 1999

Related U.S. Application Data

(63) Continuation of application No. PCT/DE98/02918, filed on Oct. 1, 1998.

(30) Foreign Application Priority Data

Oct. 17, 1997 (DE) .............................................. 197 45 933

(51) Int. Cl.$^7$ .................................................. B60H 1/34
(52) U.S. Cl. .......................................... 454/154; 454/316
(58) Field of Search .............................. 454/76, 109, 154, 454/155, 316

(56) References Cited

U.S. PATENT DOCUMENTS 5,746,651 * 5/1998 Arajs et al. ........................... 454/154

FOREIGN PATENT DOCUMENTS

| 36 10 894 A1 | 10/1987 | (DE) . | |
| 11 319 449 | 6/1973 | (GB) . | |
| 1 385 874 | * 3/1975 | (GB) | ..................................... 454/154 |

* cited by examiner

Primary Examiner—Harold Joyce
(74) Attorney, Agent, or Firm—Hoffmann & Baron, LLP

(57) ABSTRACT

A fresh air nozzle device (10) for the passenger compartment of a vehicle, having a housing (12) which at the outlet side is provided with slats (30) for guiding the air flow and which has a slat-adjusting member. At the outlet side the housing (12) has a circular opening end portion (14) on which there is rotatably provided an adjusting ring (22) forming the slat-adjusting member. The slats (30) are connected to the adjusting ring (22). The opening end portion (14) of the housing (12) is formed with two diametrally oppositely disposed longitudinal slots which are oriented in the peripheral direction of the housing (12) and through each of which extends a respective connecting pin (34). The two connecting pins (34) are axially aligned with each other and they serve for connecting the adjusting ring (22) to an inner ring (24) which is provided with the slats (30).

8 Claims, 2 Drawing Sheets

FRESH AIR NOZZLE DEVICE FOR A VEHICLE

This application is a continuation of International Application Ser. No. PCT/DE98/02918, filed on Oct. 1, 1998.

FIELD OF THE INVENTION

The invention concerns a fresh air nozzle device for the passenger compartment of a vehicle, comprising a housing which at the outlet side is provided with slats for guiding the air flow and with a slat-adjusting member, wherein at the outlet side the housing has a circular opening end portion at which there is rotatably provided an adjusting ring which forms the slat-adjusting member and which is connected to the slats.

BACKGROUND OF THE INVENTION

Fresh air nozzle devices are known, which are provided at the outlet side with an opening of rectangular cross-section. Those fresh air nozzle devices usually have horizontal slats and vertical slats which are displaced in the longitudinal direction with respect to the horizontal slats. In such an arrangement the one slats are for example integrally connected to the housing while the other slats are disposed pivotably in the housing. In such an arrangement for example the housing as a whole is pivoted, to pivot the first-mentioned slats.

A fresh air nozzle device of the kind set forth in the opening part of this specification is known from DE 36 10 894 A1. In that known fresh air nozzle device the housing which has slats for deflecting the air flow and which is rotatable about the central axis of an air duct for altering the discharge flow direction comprises a distributor ring and a push-on casing portion which projects therefrom in a collar-like configuration, with flexible casing segments for pushing on to the air duct. The slats are disposed in the region of the distributor ring of the housing.

SUMMARY OF THE INVENTION

GB-A-13 19 449 discloses a fresh air nozzle device for the passenger compartment of a vehicle, having a cylindrical housing with an adjusting ring. Provided at the outlet side of the cylindrical housing, where there is the adjusting ring, are slats which are adjustable by means of the adjusting ring, that is to say which can be set in position as desired in order to be able to provide for a specifically controlled air guidance effect. An adjusting knob is rotatably mounted centrally at the outlet side of the cylindrical housing and is connected to two semicircular flap elements. Each of those two flap elements is formed with a pin projecting into an associated slot in the cylindrical housing. The two slots are inclined relative to the peripheral direction of the housing so that rotation of the adjusting knob causes displacement of the two flap elements between a closure position and an open position. The slats of that known fresh air nozzle device are adjustable only in the peripheral direction of the housing.

The object of the present invention is to provide a fresh air nozzle device of the kind set forth in the opening part of this specification, which is of a simple structure from the point of view of the production engineering involved, wherein slat adjustment is effected by means of a slat-adjusting member which delimits the outlet opening.

In accordance with the invention, in a fresh air nozzle device of the kind set forth in the opening part of this specification, that object is attained in that the opening end portion of the housing is provided with two diametrally oppositely disposed longitudinal slots which are oriented in the peripheral direction of the housing and through each of which extends a respective connecting pin which are in axial alignment with each other and by means of which the adjusting ring is connected to an inner ring which is connected to the slats. In this arrangement the slats can be formed in one piece with the inner ring. That is desirable from production points of view, because it is then not necessary for the slats to be individually handled and connected to the inner ring.

In the fresh air nozzle device according to the invention it is desirable if the opening end portion of the housing is formed on the inside with a concave ring portion which has a spherical curvature and the center of curvature of which is defined by the point of intersection of the central axis of the two connecting pins with the longitudinal axis of the housing, and if the inner ring is formed on the outside with a convexly curved external contour which is adapted in shape to the concave ring portion of the housing. Such a configuration provides so-to-speak a ball-joint arrangement of the inner ring with the slats in relation to the opening end portion of the housing of the fresh air nozzle device according to the invention so that the slats which are oriented in parallel relationship with each other can be jointly adjusted as desired.

EMBODIMENTS

Another possibility provides that, in the case of the fresh air nozzle device according to the invention, the slats provided in the inner ring are jointly pivotably movable. With such a configuration of the last-mentioned kind, the slats are pivotable as desired about the longitudinal axis of the housing and can be rotated in relation to the inner ring. Such a configuration in accordance with the invention therefore also permits specifically controlled guidance for the air flow issuing from the fresh air nozzle device.

Further details, features and advantages will be apparent from the following description of two embodiments of the fresh air nozzle device according to the invention, perspective views of part of each of which are shown in the drawing.

DETAILED DESCRIPTION OF THE PREFERRED EMBODIMENTS

Figure 1:
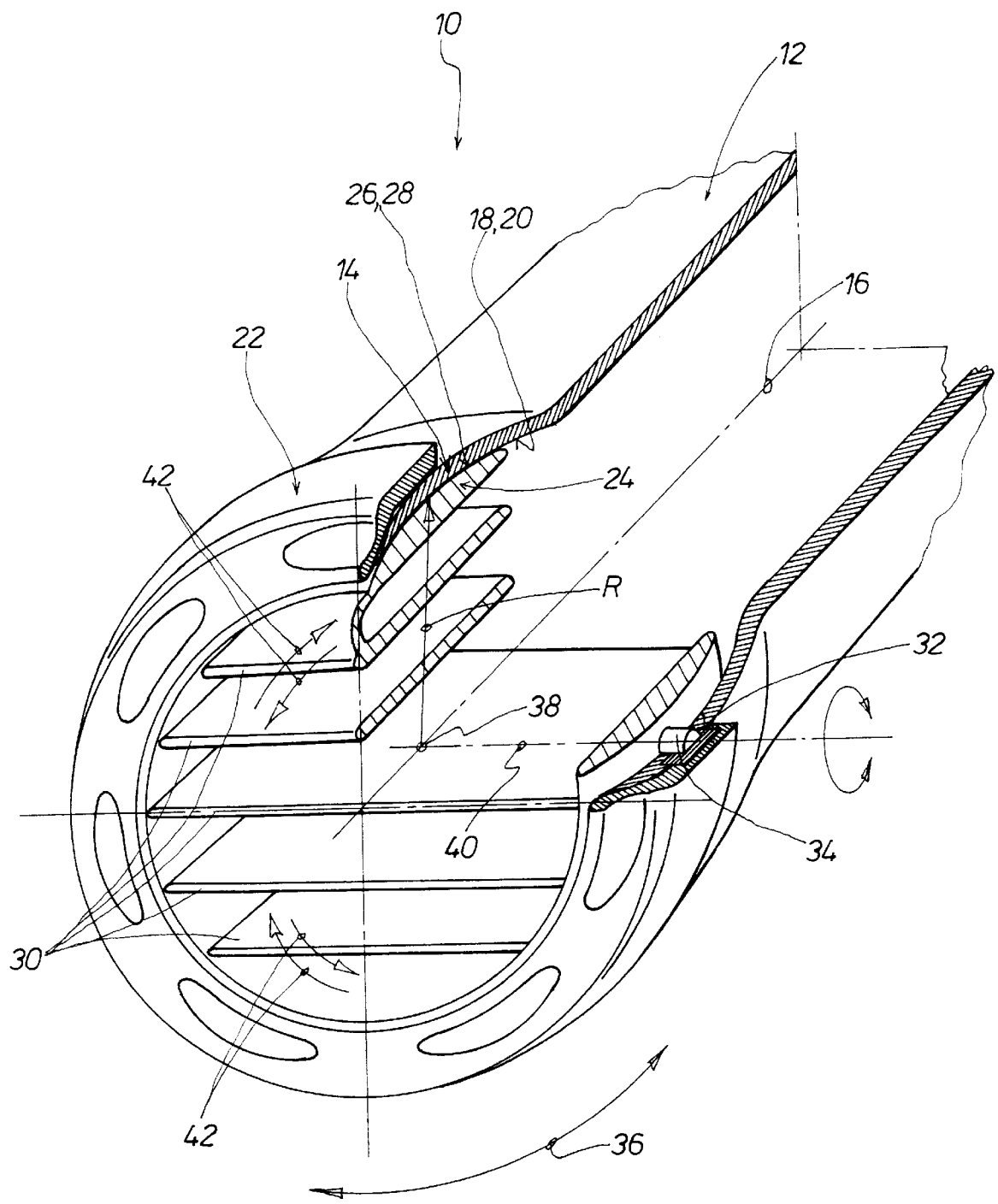
FIG. 1 shows a first embodiment of the fresh air nozzle device.

FIG. 1 shows an embodiment of the fresh air nozzle device 10 for the passenger compartment of a vehicle, which has a tubular housing 12 of which a portion is illustrated here. The fresh air nozzle device 10 is also shown in section in order clearly to reveal essential features thereof.

The housing 12 is formed at the outlet side with a circular opening end portion 14 which is concentric in relation to the longitudinal axis 16 of the housing 12. At its inside 18 the opening end portion 14 is also formed with a concave ring portion 20 which has a spherical curvature.

Provided at the outside of the opening end portion 14 of the housing 12 is an adjusting ring 22 which is displaceable in the peripheral direction of the circular opening end portion 14. An inner ring 24 is connected to the adjusting ring 22. At its outside 26 the inner ring 24 affords an external contour 28 which, being convexly curved, is adapted in shape to the concavely curved ring portion 20 of the housing 12. Slats 30 extend from one side of the inner ring 24 to the other, and are integrally connected to the inner ring 24.

The opening end portion 14 of the housing 12 is formed with two longitudinal slots 32 of which only the one longitudinal slot 32 is visible in FIG. 1. The two longitudinal slots 32 extend in the peripheral direction of the housing 12 or the opening end portion 14 of the housing 12 and are disposed in mutually diametrically opposite relationship, in relation to the longitudinal axis 16 of the housing 12.

The inner ring 24 and the adjusting ring 22 are connected together by means of two connecting projections or pins 34 of which also only one connecting pin 34 is visible in FIG. 1. The connecting pins 34 extend through the associated longitudinal slots 32 in the opening end portion 14 of the housing 12. In accordance with the longitudinal extent, as viewed in the peripheral direction, of the two longitudinal slots 32, the slats 30 are pivotable in the peripheral direction by means of the adjusting ring 22, as is indicated by the arcuate double-headed arrow 36.

The concave ring portion 20 at the inside 18 of the opening end portion 14 of the housing 12 has a spherical curvature which is identified by the arrow R. The center point 38 of the spherical curvature R is defined by the point of intersection of the central axis 40 of the two mutually axially aligned connecting pins 34, with the longitudinal axis 16 of the housing 12. Such a spherical configuration makes it possible for the slats to be pivoted about the two axially aligned connecting pins 34, as is indicated by the arcuate arrows 42.

Figure 2:
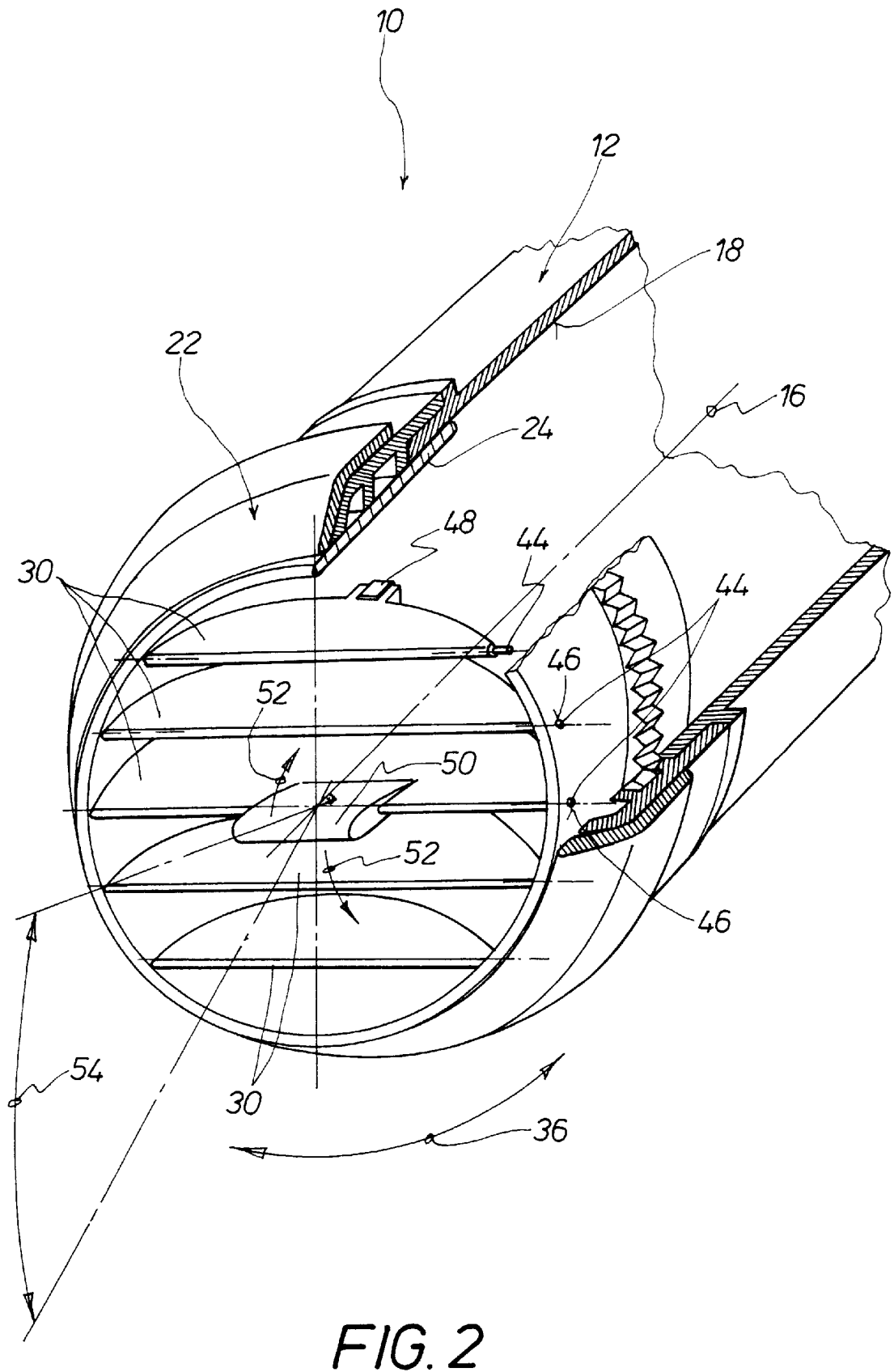
FIG. 2 is a perspective view similar to FIG. 1 showing part of a second embodiment of the fresh air nozzle device.

The fresh air nozzle device 10 as shown in FIG. 1 consequently permits pivotal movement of the slats 30 within a large three-dimensional region in space. The configuration of the fresh air nozzle device 10 shown in FIG. 2 has an even greater adjustment range, being a structure in which the adjusting ring 22 is fixedly connected to the inner ring 24 which is of a simple cylindrical configuration. The inner ring 24 is bridged over by slats 30 which are in mutually parallel orientation, as in the embodiment of FIG. 1. In the embodiment of FIG. 2 however the slats 30 are not integral components of the inner ring 24 but are carried pivotably movably thereon. For that purpose the slats 30 are provided with mounting projections or pins 44 which are supported in holes 46 in the inner ring 24. The slats 30 are movably connected together in per se known manner by means of a connecting member 48. The central slat 30 is provided with an actuating member 50 in order to be able to pivot all slats 30 jointly, as is indicated in FIG. 2 by the arcuate arrows 52. The arrow 54 illustrates the corresponding range of adjustment of the air flow in that direction in space. Rotating the adjusting ring 22 makes it possible to guide the air flow in the direction in space, which is perpendicular thereto. The last mentioned rotary movement of the adjusting ring 22 is indicated by the arrow 36, as in FIG. 1. In the construction shown in FIG. 2 the adjusting ring 22 is displaceable without any difficulties through 360° in the direction of the double-headed arrow 36.

What is claimed is:

1. A fresh air nozzle device for a passenger compartment of a vehicle comprising:
   a housing having an outlet side, the housing including a circular opening end portion having two diametrically opposed longitudinal slots oriented in a peripheral direction of the housing;
   an inner ring including slats for guiding airflow rotatably disposed on an inside of the housing opening end portion;
   an adjusting ring rotatably disposed on an outside of the housing opening end portion; and
   two diametrically opposed connecting pins, the two connecting pins extending from the inner ring through the housing longitudinal slots to the adjusting ring, the two connecting pins connecting the inner ring to the adjusting ring such that the adjusting ring forms a slat adjusting member.

2. A fresh air nozzle device as set forth in claim 1 characterised in that the slats (30) are formed in one piece with the inner ring (24).

3. A fresh air nozzle device as set forth in claim 1 characterised in that at the inside the opening end portion (14) of the housing (12) is formed with a concave ring portion (20) which has a spherical curvature (R) and the center (38) of curvature of which is established by the point of intersection of the central axis (40) of the two connecting pins (34) with the longitudinal axis (16) of the housing (12), and that on the outside the inner ring (24) is formed with a convexly curved external contour (28) which is adapted in shape to the concave ring portion (20) of the housing (12).

4. A fresh air nozzle device as set forth in claim 1 characterised in that the slats (30) provided in the inner ring (24) are jointly pivotably movable.

5. A fresh air nozzle device as set forth in claim 1, wherein the two connecting pins are secured to the inner ring and pivotally connected to the slat adjusting member.

6. A fresh air nozzle device as set forth in claim 1, wherein the adjusting ring is displaceable in the peripheral direction of the circular opening end portion.

7. A fresh air nozzle device as set forth in claim 1 wherein the slat adjusting member delimits a nozzle outlet opening such that the slat adjusting member may be manipulated by a user to adjust the position of the slats.

8. A fresh air nozzle device as set forth in claim 1, wherein the housing is rotationally fixed to the vehicle, and the slat adjusting member and inner ring rotate relative to the housing.

* * * * *